Aug. 25, 1970    F. PFAFF ET AL    3,525,485
FLIGHT CONTROL FOR VERTICALLY STARTING AND
LANDING MULTIENGINE AIRPLANES
Filed Aug. 24, 1968    2 Sheets-Sheet 1
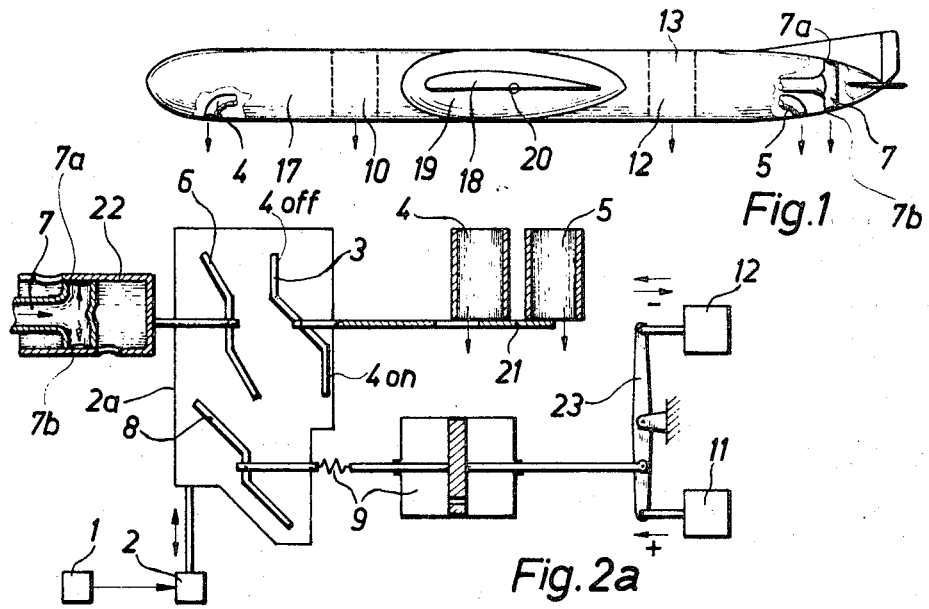
Fig.1
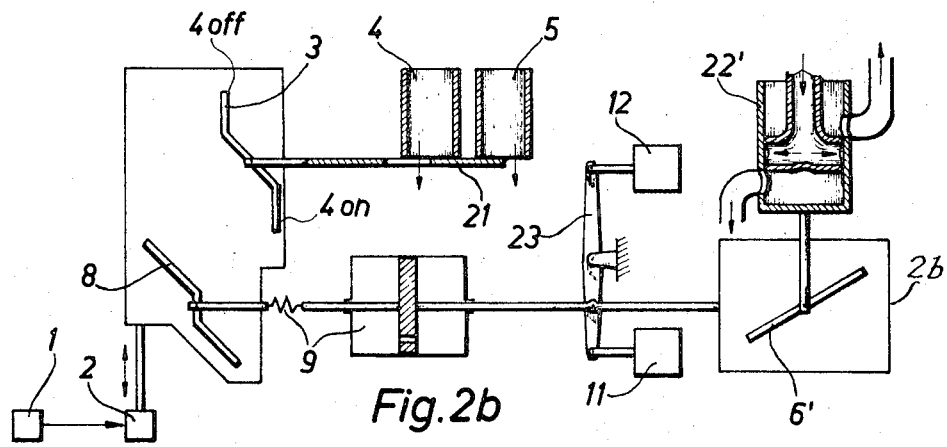
Fig.2a
Fig.2b
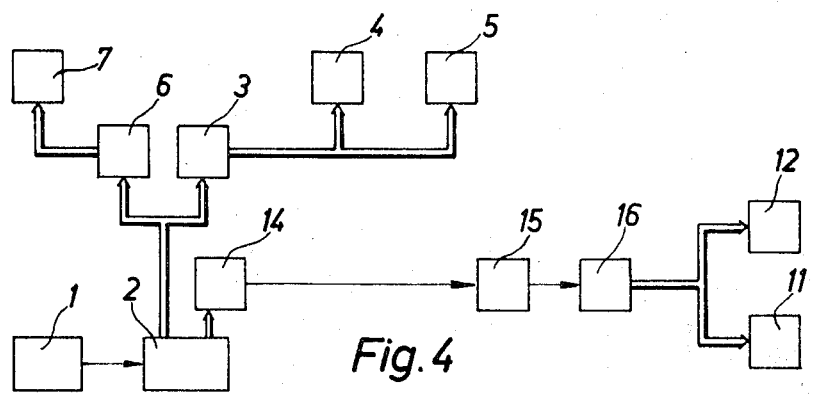
Fig.4
Inventors:
Fritz Pfaff
Rolf Staufenbiel
Heinrich Völker
By

United States Patent Office 3,525,485
Patented Aug. 25, 1970

3,525,485
FLIGHT CONTROL FOR VERTICALLY STARTING AND LANDING MULTIENGINE AIRPLANES
Fritz Pfaff, Sindelfingen, Rolf Staufenbiel, Bremen-Lilienthal, and Heinrich Völker, Bremen-Huchting, Germany, assignors to Vereinigte Flugtechnische Werke Gesellschaft mit beschrankter Haftung fruher "Weser" Flugzeugbau, Focke-Wulf/Heinkel-Flugzeugbau, Bremen, Germany
Filed Aug. 21, 1968, Ser. No. 754,307
Int. Cl. B64c *15/00, 29/04*
U.S. Cl. 244—12         5 Claims

ABSTRACT OF THE DISCLOSURE

A vertical take off and landing airplane (VTOL) having downwardly directed fore and aft thrust motors with throttles and also having fore and aft downwardly directed nozzles supplied with compressed air and having valves for differentially controlling the discharge therefrom, and also having upwardly and downwardly directed control nozzles at the stern having a valve adjustable for permitting discharge from one or the other thereof, and a control mechanism for adjusting said valves and for differentially adjusting said throttles.

---

The present invention relates to a flight position control for vertically starting and landing multiengine airplanes with driving mechanisms located outside the center of gravity of the airplane and with flight position controlling nozzles actuated by the flight position governor or by the control stick.

The jet control by means of compressed air and control nozzles has the advantage that when their thrust components are directed downwardly the thrust losses are immaterial with regard to those which occur in connection with the thrust modulation. Furthermore, larger lever arms are possible with jet control.

With multiengine airplanes, the possibility of withdrawing compressed air is frequently such that compressed air can be withdrawn continuously or in a fully variable manner from a portion of the driving mechanisms while compressed air can be withdrawn only intermittently from another portion of the driving mechanisms.

The control by means of continuous or fully variable withdrawal of compressed air from the driving mechanism is frequently not sufficient when encountering disturbances of a greater or continuous extent as, for instance, in case of failure of eccentrically arranged driving mechanisms, in case of the shifting of the center of gravity, when encountering aerodynamic moments and when encountering moments caused by the entering impulse when starting the transition flight. In such instances, it is necessary to aid the continuous jet control, for instance, by thrust modulation or by additionally employing intermittent air under pressure. In such an instance, however, generally a greater loss in thrust occurs.

It is, therefore, an object of this invention to provide a flight position control which will overcome the above-mentioned drawbacks.

It is another object of this invention to provide a flight position control, as set forth in the preceding paragraph, which will retain the advantages of the continuous jet control.

In order to maintain the advantages of the continuous jet control, the thrust modulation or the intermittent air under pressure must be resorted to only when disturbances of greater magnitude and disturbances occurring over a longer period of time are involved. To this end, the orders for the thrust modulation and selectively also for the nozzles with intermittent air under pressure are conveyed through a dead zone and a retarding member, the so-called trim control.

These three features, when considered individually, are known per se. However, when employed simultaneously they form the subject of the present invention because it is only by the combination of these three features that a sufficiently safe airplane position control will be assured for vertically starting air vehicles.

The three features making up the above-mentioned combination are the following ones:

(a) Control nozzles from which a uniform or even quantity of air under pressure is continuously discharged;
(b) Control nozzles from which compressed air is discharged only from time to time;
(c) A device for thrust modulation.

The delaying member may be of a mechanical, electrical, or hydraulic type.

The hydraulic type, expediently also is termed trim-servo, inasmuch as it operates with oil under pressure as auxiliary energy. A permanent disorder moment produced by the failure of a driving mechanism brings about an adjust signal from the flight position control which lasts for a relatively long time.

Generally, it is only such an adjust signal which with the present invention is able, in view of the low pass effect of the retarding member to act upon the driving mechanism connected to the control arrangement, and to start the thrust modulation thereof.

The flight position control, according to the present invention, also applies to all vertically starting and landing multi-engine airplanes with driving mechanism thrusts acting eccentrically with regard to the center of gravity of the airplane, in other words, in the same way with driving mechanisms mounted in nacelles and also mounted in the hull of the airplane, while the driving mechanisms are generally arranged symmetrically with regard to the center of gravity of the plane. With different locations of the driving mechanisms with regard to the center of gravity of the plane, in case of disorders also moments about different axes are encountered which then have to be compensated for by counter moments about the same axes.

When employing the present invention, the control nozzles for continuous compressed air can be caused immediately to discharge, whereas the flight position control nozzles for intermittent compressed air can by the interposition of a dead zone prior to their discharge or by interposing a retarding member, be caused to aid in the discharge only after the complete opening of the control nozzles operating with continuous compressed air. The thrust modulation is by interposing a dead zone and following said dead zone by an additional delaying intermediate member put into motion only gradually.

A flight position control of the above-mentioned type will work particularly reliably if it is equipped with a slide block mechanism which is adjusted in conformity with control signals of the flight position control through an adjusting motor and which comprises three slide blocks. One of the slide blocks controls the control nozzles for compressed air to be discharged downwardly in a continuous manner. The second slide block controls the control nozzles for intermittent compressed air, and the third slide block controls the delayed actuation of the thrust moduation.

If, with an airplane it is necessary to use intermittent compressed air particularly sparingly, a design of the flight position control is particularly advantageous which is characterized in that the control nozzles for intermittent compressed air are coupled to the slide block system of the thrust modulation and behind the delaying member of the thrust modulation are by means of a slide block connected to a linkage system of the thrust modulation.

The invention is illustrated by way of example in the accompanying drawing showing an embodiment of a simplified flight position control according to the invention, of a vertically starting plane with two eccentrically, and in the hull symmetrically installed lifter mechanisms, said control forming a nick control. More specifically, FIG. 1 diagrammatically illustrates a side view of a vertical take-off airplane with a lifting mechanism in the hull of the plane ahead of the center of gravity of the plane and located symmetrically with regard to the center of gravity of the plane while a second lifting mechanism is arranged in the hull of the plane behind the center of gravity of the plane.

FIG. 2a shows by way of a diagram the operation of a mechanical nick control in connection with a plane of FIG. 1, while the nick control is in an equilibrium position of the plane. The nozzles for intermittent compressed air are connected to the slide block for the nozzles with constant compressed air.

FIG. 2b shows the same arrangement as FIG. 2a with the difference that the nozzle for intermittent compressed air is connected to the discharge or exit of the delaying unit for the thrust moduation.

FIG. 4 illustrates by way of diagram a similar electric design of a control mechanism.

Figure 3A:
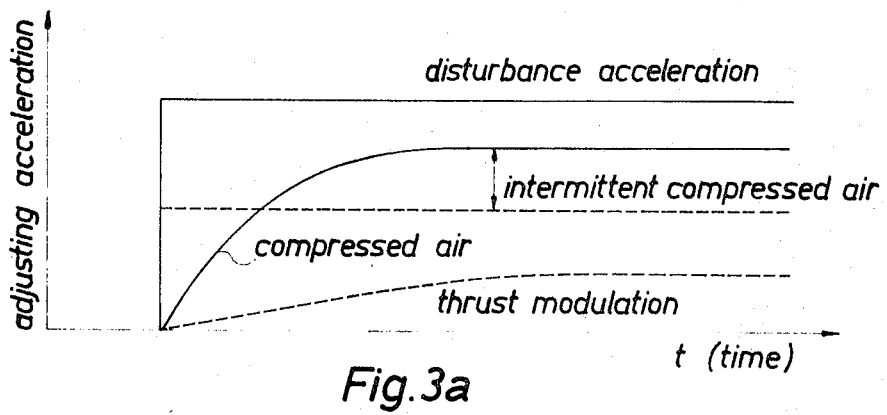
FIG. 3a illustrates the transgressional functions pertaining to FIG. 2a. Similarly.

Referring now to the drawings in detail, the arrangement shown therein comprises a flight position control connected to the control stick and with the position gyroscopes. The arrangement furthermore comprises an adjusting motor 2. A slide block 2a is connected to motor 2, which is under the control of a governor, to be reciprocated thereby. A control slot 3 in block 2a engages a slide 21 which is operable for opening and closing the downwardly discharging nozzles 4 and 5 in hull 17 of the plane which are supplied continuously with compressed air. Nozzle 4 is on the bow side of the center of gravity 20 of the ship, while nozzle 5 is on the stern side of the said center of gravity of the ship.

The arrangement according to the invention furthermore comprises a control slot 6 in slide block 2a for actuating valve 22 for opening and closing the upwardly directed nozzle 7a and the downwardly directed nozzle 7b of the stern nozzle 7. Whereas, one or the other, or both, of nozzles 4, 5 is always discharging, nozzles 7a and 7b discharge only one at a time, or are both cut off. Slot 6 has a central portion parallel to the direction of movement of slide block 2a where both of nozzles 7a and 7b are closed and end portions where the said nozzles are respectively effective.

Slot 3, on the other hand, has a central portion of about the same length as the central portion of slot 6 during which slide 21 is moved from a position wherein only nozzle 4 is effective to a position wherein only nozzle 5 is effective. At each end of slot 3 is a portion wherein a respective one only of the nozzles 4, 5 is effective. Nozzles 4 and 5 gradually change from being effective to non-effective along the central portion of slot 3 so that infinite variability of the control influence from nozzles 4, 5 is had.

A further slot 8 in slide block 2a has a short central portion parallel to the direction of movement of slide block 2a and end portions inclined in opposite directions from the central portion. A link engages slot 8 and is connected to a lever 23. A dashpot and resilient element 9 connected to the link delay the response of lever 23 to movement of slide block 2a. Lever 23 at one end is connected to throttle 11 for downwardly thrusting forward lift motor 10 (FIG. 1) while the other end of lever 23 is connected to throttle 12 for downwardly thrusting rear lift motor 13 (FIG. 1).

The described arrangement is such that small movements of slide block 2a from the central position in which it is shown in FIG. 2a will not adjust throttles 11 and 12 and will not adjust valve 22 for nozzles 7a and 7b. Nozzles 4 and 5, however, are differentially adjusted, one becoming more effective and the other becoming less effective. Specifically, if slide block 2a moves downwardly, nozzle 5 is opened further while, simultaneously, nozzle 4 is closed further. Upward movement of slide block 2a, on the other hand, will close nozzle 5 further while opening nozzle 4 further.

Greater movement of slide block will make one of the upper inclined portions of slot 8 effective to cause movement of lever 23 and, in addition, to adjust throttles 11 and 12 to influence motors 10 and 13 differentially. Specifically, said greater movement of slide block 2a upwardly will cause the lower inclined portion of slot 8 to become effective to still further open nozzle 5, while further closing nozzle 4 and will also tilt lever 23 counterclockwise (FIG. 2a) to open throttle 12 for motor 13 further, while reducing the setting of throttle 11 for motor 10. Downward movement of slide block 2a to cause the upper inclined portion of slot 8 to become effective will tilt lever 23 clockwise (FIG. 2a) to open throttel 11 for motor 10 further, while reducing the setting of throttle 12 for motor 13.

Still further movement of slide block 2a will make the inclined portions of slot 6 effective to open one or the other of nozzles 7a, 7b. Specifically, downward movement of slide block 2a to make the upper inclined portion of slot 6 effective will cause nozzle 7a to open while upward movement of slide block 2a to cause the lower inclined portion of slot 6 to become effective will open nozzle 7b.

To summarize, an initial predetermined amount of movement of slide block 2a from its illustrated position will differentially influence only nozzles 4 and 5.

During a further predetermined amount of movement of slide block 2a in either direction, nozzles 4 and 5 are further differentially influenced, while throttles 11 and 12 are differentially influenced to cause motors 10 and 13 to augment the effect of nozzles 4 and 5 on the ship.

During a still further, and final, predetermined amount of movement of slide block 2a, nozzles 4 and 5 are not further changed because the limit of adjustment thereof has been reached, i.e., one is fully open and the other is fully closed. Adjustment of throttles 11 and 12, however, continues while one of nozzles 7a, 7b commences to open and reaches full open position at the end of the final movement of slide block 2a.

FIG. 4 is a schematic block diagram and shows an electric position indicator 14, a potentiometer, for example.

The arrangement, furthermore, comprises an electric retarding member 15 and an adjusting motor 16 for the thrust modulation. The hull 17 has in customary manner connected thereto the wings 18 which carry nacelles 19 for the forward propulsion or driving mechanism. The center of gravity of the airplane is, as mentioned, designated by the reference numeral 20. The nozzles 4 and 5 for continuous compressed air are controlled by a control valve 21, while the double nozzle 7 for the intermittent discharge of compressed air is controlled by a control valve 22 which is coupled to the slot in slide block 2a.

In FIG. 2b, the intermittent compressed air is controlled by a control valve 22' which is controlled by slot 6' in a slide block 2b linked to lever 23. The movement of valve 22' is in this manner delayed the same as that of lever 23.

Figure 5:
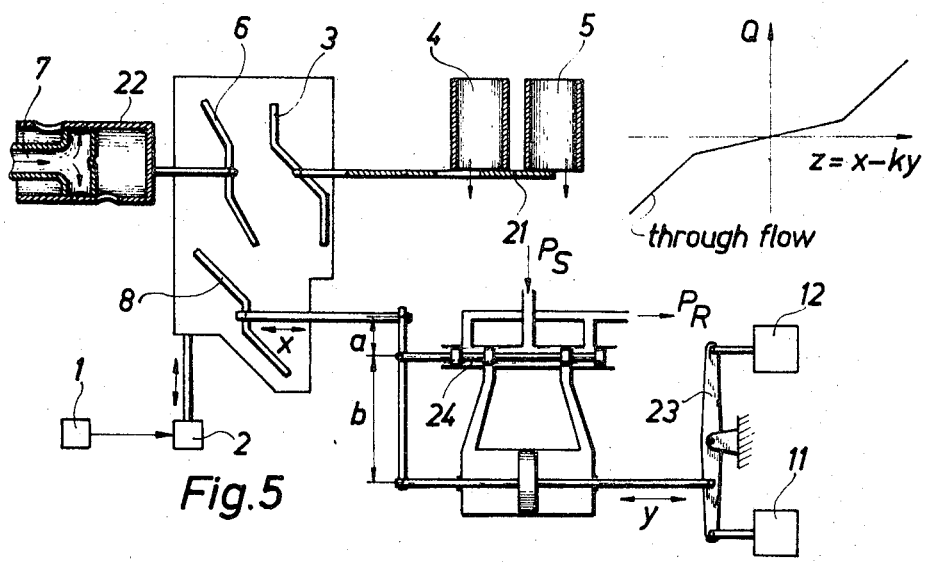
FIG. 5 illustrates a diagram of action of a similar hydraulic design.

In FIG. 5, a hydraulic servo-valve pertaining to the retarding device for the thrust modulation is designated with the reference numeral 24.

In the hull 17 of the vertical take off and landing plane—VTOL plane—which is provided with wings 18 and nacelles 19, which latter may also house lift driving mechanisms, there is arranged symmetrically to the center of gravity 20 of the airplane, a lift drive mechanism 10 in front of the said center of gravity 20, and a lift drive mechanism 13 of the same output behind the said center of gravity 20. In the bow of the airplane there is provided a downwardly discharging nozzle 4 for discharging continuous compressed air, while in the stern of the VTOL plane there is provided an identical downwardly discharging nozzle 5 for discharging continuous compressed air. Also arranged in the stern of the airplane is a double nozzle 7 with a downwardly directed discharge opening and an upwardly directed discharge opening for discharging intermittent compressed air in downward direction or in upward direction.

As will be evident from the illustrated diagrams of FIG. 2a showing a mechanically operating rocker control installation, the nozzles 4 and 5 for continuous compressed air—nozzle 4 in the bow blowing downwardly, and nozzle 5 in the stern blowing downwardly—may, by slides or valves 21, either both be opened about half, or one of the nozzles 4 or 5 may be fully opened, whereas the other nozzle may be completely closed.

According to FIG. 2a, the valves 21 of the bow nozzle 4 and of the stern nozzle 5 are each half open so that from both nozzles 4 and 5 the same amount of continuous compressed air flows downwardly so that the moments created thereby around the center of gravity 20 will cancel each other, which means that no control torque acts upon the plane.

Figure 3B:
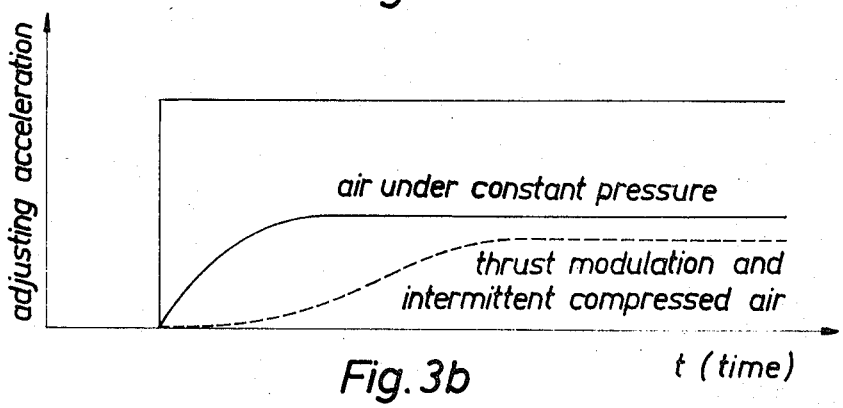
FIG. 3b shows the transgressional functions pertaining to FIG. 2b.

Whereas, according to FIG. 2a, the slide block 6 for controlling the double nozzle 7 for intermittent compressed air is coupled directly to the control slide block 3 for nozzles 4, 5 with continuous compressed air, FIG. 2b shows a different coupling possibility, namely, at the exit of the trim servo-valves. FIGS. 3a and 3b by way of a graph show the respective conditions when shifting from one situation to another situation. According to FIG. 3a, the adjusting acceleration of the intermittent compressed air is added to that produced by the nozzles discharging constant compressed air. The intermittent compressed air will thus become effective without delay, but in view of the dead zone only with larger signals and serves for covering peaks (see also FIG. 2a).

The thrust modulation on the other hand will, due to its great delay and dead zone (see FIG. 2a) become effective only with larger and longer signals of the control mechanism.

As shown in FIG. 3b, the thrust modulation and the intermittent compressed air are, with the arrangement of FIG. 2b, effective together, and in view of the great delay and the dead zone only at greater and longer signals of the control device.

The rocker control diagrammatically shown in FIG. 4 for the hovering flight and transition with an electric delaying member for the thrust modulation may, in an analogous manner, and in the same way, be employed for the flight position control of a VTOL plane while primarily electric auxiliary means known per se, are employed.

FIG. 5 shows the mechanical delaying member in the form of a hydraulic adjusting element. The desired transition function is determined, for instance, by the requirement that the thrust modulation must, in case of failure of the driving mechanism, become effective sufficiently fast, but with minor disturbances must respond only slowly. These requirements are met by a specific valve property. Whereas heretofore known servo-valves within a linear range have as characteristic the so-called time constant which means that within the linear range all commands are carried out equally fast, and in the non-linear range, in view of the limitation of the transmission time, have increasing transmission time, the servo-valve employed according to the invention has the properties to furnish very small flow quantities at small signals, and very large flow quantities at large signals. This brings about that small signals are carried out very slowly and that large signals are carried out very fast. This will be realized by the fact that the through flow Q is dependent, not only from $x$ (entry signal into the open servo-valve), but also from $K' x F_v$ (valve control surface) through $x$. The surface $F_v$ does not change, as is well known, linearly with $x$, but with a factor $K'$ dependent on $x$. Any desired $K'$ is feasible if a corresponding requirement exists. If now, the servo-valve is, through the lever $a$–$b$, coupled to $y$, the following relationship exists:

$$x = f(x)$$

The control factor Z effective on the valve from the mixed command may be expressed as:

$$z = x - \frac{a}{b} \cdot y$$

The transmission function of this servo-valve follows the conditions resulting from:

$$Q = z \cdot C \cdot K' \cdot F_v$$

The influences of $P_s$ representing system pressure and $P_R$ representing return pressure are contained in C.

It is, of course, to be understood that the present invention is, by no means, limited to the particular arrangements shown in the drawings, but also comprises numerous modifications, the scope of the invention being determined by the disclosure.

What is claimed is:

1. In a vertical take off and landing airplane having a center of gravity; a first downwardly acting thrust motor in front of said center of gravity and a second downwardly acting thrust motor in back of said center of gravity, a first downwardly directed control nozzle in front of said center of gravity and a second downwardly directed control nozzle in back of said center of gravity, a third upwardly directed nozzle in back of said center of gravity and a fourth downwardly directed nozzle also in back of said center of gravity, respective throttles for said thrust motors, and control means for controlling the discharge of compressed air from said nozzles and the settings of said throttles, said control means including adjusting motor means, valves for said nozzles, linkage means connected to said valves and operated by said motor means and operable for effecting continuous differential adjustment of the discharge from said first and second nozzles during movement of said linkage means through a first range extending through a neutral position of the linkage means and equal distances on opposite sides of said neutral position, said linkage means also being operable for adjusting the discharge of a respective one of said third and fourth nozzles during movement of the linkage means through a second range comprising portions extending from each end of said first range, said linkage means also being operable for differentially adjusting said throttles during movement of said linkage means through a third range consisting of portions extending from the ends of said second range toward but terminating short of said neutral position.

2. A vertical take off and landing airplane according to claim 1, in which said linkage means includes a respective linkage portion leading to said throttles, and delay means operatively connected to said linkage portion to delay the movement thereof in response to operation of said adjusting motor means.

3. A vertical take off and landing airplane according to claim 2 which includes reciprocable slide block means operatively connected to said adjusting motor means so as to be driven in reciprocation thereby, a first slot in said slide block means and a first linkage element connected to the valves for said first and second nozzles and engaging said first slot, a second slot in said slide block means and a second linkage element connected to the valves of said third and fourth nozzles and engaging said second slot, and a third slot in said slide block means engaging said linkage portion leading to said throttles.

4. A vertical take off and landing airplane according to claim 3 in which said slide block means includes an individual slide block containing said second slot, said individual slide block being connected to said linkage portion pertaining to said throttles so that said delay means is effective thereon.

5. A vertical take off and landing airplane according to claim 2 in which said delay means comprises a hydraulic servo motor forming the connection of said linkage portion with said throttles.

References Cited

UNITED STATES PATENTS

| | | | |
|---|---|---|---|
| 2,840,323 | 6/1958 | Hood et al. | 244—52 |
| 3,112,616 | 12/1963 | Adamson et al. | 244—52 |
| 3,161,382 | 12/1964 | Pfaff | 244—75 |
| 3,176,936 | 4/1965 | Howard | 244—75 |
| 3,347,493 | 10/1967 | Leathley | 244—12 |

MILTON BUCHLER, Primary Examiner

J. S. PITTENGER, Assistant Examiner

U.S. Cl. X.R.

244—52